United States Patent [19]

Simpson et al.

[11] Patent Number: 5,300,217

[45] Date of Patent: Apr. 5, 1994

[54] HYDROPROCESS UTILIZING A DELTA ALUMINA-SUPPORTED NICKEL AND MOLYBDENUM CATALYST

[75] Inventors: Howard D. Simpson, Irvine; Milan Skripek, Fullerton, both of Calif.

[73] Assignee: Union Oil Company of California, Los Angeles, Calif.

[21] Appl. No.: 25,057

[22] Filed: Mar. 2, 1993

Related U.S. Application Data

[62] Division of Ser. No. 868,775, Apr. 14, 1992, Pat. No. 5,223,472.

[51] Int. Cl.$^5$ ............................................. C10G 45/08
[52] U.S. Cl. ........................ 208/216 PP; 208/251 H; 208/254 H
[58] Field of Search ......... 208/216 PP, 251 H, 254 H

[56] References Cited

U.S. PATENT DOCUMENTS

| | | | |
|---|---|---|---|
| 4,048,060 | 9/1977 | Riley | 208/210 |
| 4,069,139 | 1/1978 | Riley et al. | 208/216 |
| 4,082,695 | 4/1978 | Rosinski et al. | 502/314 |
| 4,113,656 | 9/1978 | Riley et al. | 502/220 |
| 4,271,042 | 6/1981 | Oleck et al. | 502/314 |
| 4,460,707 | 7/1984 | Simpson | 502/315 |
| 4,548,710 | 10/1985 | Simpson | 208/216 PP |
| 4,572,778 | 2/1986 | Ward | 208/89 |

*Primary Examiner*—R. Bruce Breneman
*Assistant Examiner*—Walter D. Griffin
*Attorney, Agent, or Firm*—Gregory F. Wirzbicki; Alan H. Thompson

[57] ABSTRACT

A catalyst useful for hydroprocessing a hydrocarbon-containing oil contains at least one hydrogenation component on an amorphous, porous refractory oxide containing delta alumina. The catalyst is prepared by impregnating support particles having a narrow pore size distribution and a median pore diameter greater than about 185 angstroms with a solution containing a precursor of the hydrogenation components, followed by drying and calcining. The catalyst is useful for promoting a number of hydrocarbon hydroprocessing reactions, particularly hydrogenative desulfurization, demetallation and denitrogenation, and most particularly, hydrodemetallation of residuum-containing oils.

21 Claims, No Drawings

HYDROPROCESS UTILIZING A DELTA ALUMINA-SUPPORTED NICKEL AND MOLYBDENUM CATALYST

This is a division of application Ser. No. 07/868,775, filed Apr. 14, 1992, now U.S. Pat. No. 5,223,472.

BACKGROUND OF THE INVENTION

1. Field of the Invention

This invention relates to hydrocarbon hydroprocessing catalysts, such as those utilized to catalyze the reaction of hydrogen with organonitrogen, organosulfur and organometallic compounds. More particularly this invention is directed to a catalyst useful for the hydrodesulfurization, hydrodenitrogenation and hydrodemetallation of hydrocarbon-containing feeds, such as residuum oils, and to a method for preparing such catalysts with porous, amorphous refractory oxide supports.

2. Description of Prior Art

In the refining of hydrocarbons, it is often necessary to upgrade a hydrocarbon-containing oil, such as a residuum, by hydroprocessing. Among the known hydroprocesses are hydrodesulfurization, hydrodenitrogenation and hydrodemetallation wherein feedstocks such as residuum-containing oils are contacted with catalysts under conditions of elevated temperature and pressure and in the presence of hydrogen so that the sulfur components are converted to hydrogen sulfide, the nitrogen components to ammonia, and the metals are deposited (usually as sulfides) on the catalyst.

Hydroprocessing is usually carried out with a catalyst containing Group VIB and Group VIII hydrogenation metal components on a refractory oxide support.

Generally, hydroprocessing catalysts having a substantial number of pores of diameter less than 120 angstroms are effective for catalyzing desulfurization and denitrogenation reactions in residuum feedstocks, while catalysts having a substantial amount of pore volume in relatively larger pores (particularly pores of diameter greater than about 150 angstroms) are effective for removal of contaminant metals (such as nickel and vanadium) from such feedstocks. In other words, hydroprocessing catalysts having pores of relatively large size have demonstrated greater effectiveness for demetallation of a residuum feedstock than catalysts of smaller sized pores.

Although conventional catalysts are active and stable for hydrocarbon hydroprocessing reactions, catalysts of yet higher activities and stabilities are still being sought. Increasing the activity of a catalyst increases the rate at which a chemical reaction proceeds under given conditions, and increasing the stability of a catalyst increases its resistance to deactivation, that is, the useful life of the catalyst is extended. In general, as the activity of a catalyst is increased, the conditions required to produce a given end product, such as a hydrocarbon of given sulfur, nitrogen, and/or contaminant metals content, become more mild. Milder conditions require less energy to achieve the desired product, and catalyst life is extended due to such factors as lower coke formation or the deposition of less metals. The search continues for catalysts which are still more active for catalyzing both demetallation and desulfurization reactions during hydrocarbon hydroprocessing, yet are also stable.

SUMMARY OF THE INVENTION

Briefly, the invention provides a catalyst useful for hydroprocessing hydrocarbon-containing feedstocks and a method for preparing such a catalyst from an amorphous, porous refractory oxide support containing delta alumina. The catalyst is characterized by a relatively low hydrogenation metals loading and a relatively narrow pore size distribution. More specifically, the catalyst contains about 0.1 to about 5.0 weight percent of Group VIII metals, calculated as the monoxide, and about 2.0 to about 10.0 weight percent of Group VIB metals, calculated as the trioxide. The porosity characteristics of the catalyst are such that at least 85 percent of the total pore volume lies in pores of diameter greater than about 180 angstroms, with a median pore diameter in the range from about 185 to about 230 angstroms. The low metals loading and narrow pore size distribution together provide a catalyst highly effective for catalyzing reactions for removing contaminant compounds from hydrocarbon-containing feedstocks.

In a preferred embodiment, the catalyst is obtained by impregnating support particles containing both gamma and delta alumina. The preferred catalyst contains at least one nickel or cobalt metal hydrogenation component in combination with at least one molybdenum or tungsten metal hydrogenation component in a total hydrogenation metal amount less than 12 weight percent (calculated as the monoxide and trioxide, respectively). The preferred catalyst has less than 10 percent of the total pore volume in pores of diameter no greater than 180 angstroms and has a narrow pore size distribution wherein (1) at least 70 percent of the total pore volume is in pores of diameter from about 20 angstroms above to about 20 angstroms below a median pore diameter in the range of 190 to 230 angstroms, (2) less than 10 percent of the total pore volume is in pores of diameter greater than 300 angstroms, and (3) less than about 5 percent of the total pore volume is in pores of diameter less than 150 angstroms.

The preferred hydroprocessing catalyst is prepared by a method wherein support particles having a narrow pore size distribution and containing at least 10 weight percent each of both delta and gamma alumina are impregnated with an aqueous impregnating solution comprising a dissolved molybdenum component and a dissolved nickel component, followed by calcination. In this preferred embodiment, the support particles are prepared by calcining alumina-containing extrudates at a temperature greater than about 1,800° F. in the presence of water vapor. The final catalyst contains about 3 to about 8 weight percent molybdenum components (as $MoO_3$) about 0.01 to about 3 weight percent nickel components (as NiO), at least 10 weight percent of delta alumina, and the balance gamma alumina. The catalyst has a surface area less than 125 $m^2$/gram and porosity distribution wherein (1) at least 70 percent of the total pore volume is in pores of diameter from about 20 angstroms above to 20 angstroms below a median pore diameter in the range from about 190 to about 220 angstroms, (2) less than about 10 percent of the total pore volume is in pores of diameter greater than 300 angstroms, and (3) less than 10 percent of the total pore volume in pores of diameter less than 180 angstroms.

Catalysts prepared in accordance with the invention are particularly useful for promoting the hydroprocessing of hydrocarbon-containing residuum oils. A catalyst prepared with the support particulates described above provides suitable activity and high stability while promoting high conversions of organosulfur and organonitrogen compounds in hydrocarbon residuum-containing feeds to hydrogen sulfide and ammonia, respectively. During upgrading of such feedstocks, the catalyst of the invention also demonstrates surprisingly high stability for the simultaneous conversion of organometallic compounds to forms which deposit on the catalyst.

DETAILED DESCRIPTION OF THE INVENTION

The invention is directed to a catalyst useful for hydroprocessing a hydrocarbon-containing oil. The catalyst is particularly well suited for hydrodemetallation of a residuum. The catalyst typically contains between 0.1 and 12 weight percent of at least one active metal hydrogenation component (calculated as the metal trioxide). Usually the hydrogenation component comprises a metal component selected from the group consisting of Group VIB metals and Group VIII metals. (For purposes of calculation of hydrogenation components on the catalyst, all Group VIB metal components are calculated as the metal trioxide, all Group VIII metal components are calculated as the monoxide, and all other hydrogenation components calculated as the trioxide, $MO_3$, where M is the metal.) Such hydrogenation components are supported on any nonzeolitic support particle comprising a porous, amorphous refractory oxide containing delta alumina. The content in the support normally comprises greater than about 10 weight percent, preferably greater than 20 weight percent, and most preferably greater than 40 weight percent. The overall content of delta alumina in the finished catalyst is usually greater than 5 percent and normally in the range from about 5 to about 60 weight percent, preferably between 10 and 50 weight percent, and most preferably between 15 and 45 weight percent, calculated as $Al_2O_3$. In addition to delta alumina in the support, preferred catalysts contain at least 5, and most preferably, between about 20 and 95 weight percent of gamma alumina.

The delta-alumina-containing support particles may also contain other porous amorphous refractory oxides such as magnesia, zirconia, silica, titania, other aluminas including silica-alumina, lithium-alumina, phosphorus-alumina, lithium-phosphorus-alumina, and the like. Mixture composites of the foregoing refractory oxides are also contemplated. Supports containing both delta and gamma alumina are the most highly preferred, particularly those supports containing at least 10, and preferably at least 20 weight percent of delta alumina. Preferred support particles having the preferred physical characteristics disclosed herein are available from AKZO-Chemie, Haldor-Topsoe, and Criterion Catalyst Company, L.P.

The amorphous, porous refractory oxide support material is usually prepared in the form of shaped particulates, with the preferred preparation method being to extrude a precursor of the desired support through a die having openings therein of desired size and shape, after which the extruded matter is cut or broken into extrudates of desired length. The precursor may be a refractory oxide gel such as a spray-dried or peptized alumina gel. The support particles may also be prepared by mulling (or pulverizing) a precalcined porous refractory oxide to a particle size less than about 100 microns diameter and extruding the refractory oxide material. Also, the support particles may be prepared by mulling and extruding a combination of precursor gel and crushed precalcined porous refractory oxide in a weight ratio in the range from about 1:20 to about 20:1.

An illustrative precursor of the support can be prepared by precipitating the oxides or hydrated oxides of aluminum, from aqueous solutions of aluminum salts. Suitable proportions of the water soluble salts of aluminum, such as the sulfate, chloride or nitrate and suitable proportions of water soluble salts of the other materials, such as a sodium silicate or titanate, etc., are precipitated from solution by adjusting the pH of the solution with acidic or basic material. The precipitate is usually washed and otherwise treated to remove impurities as necessary.

The support particles prepared in the form of gel extrudates are generally precalcined prior to impregnation, especially if a delta-gamma alumina combination is the desired support material. Temperatures above about 900° F. are usually required to convert the precursor of the desired support to the porous amorphous refractory oxide form, as for example, the conversion of alumina gel to gamma alumina. Preferably, temperatures above about 1,800° F., and more preferably above 1,900° F., are utilized to effect further transformation, with periods of one-half to four hours generally being utilized to produce preferred gamma alumina-delta alumina extrudates.

The calcination of the support precursors utilized in the present invention to achieve the delta alumina-gamma alumina composites is preferably conducted in an atmosphere containing water vapor (and oxygen). Typically the partial pressure due to water vapor in the oxygen-containing calcination atmosphere is greater than about 10 percent, and preferably greater than about 50 percent, of the total pressure of the calcination atmosphere. Ordinarily, the calcination is conducted in the presence of water vapor at a total pressure from about 0.1 to less than about two atmospheres, i.e., less than about 30 p.s.i.a., and the partial pressure of water vapor in the calciner is ordinarily from about 1.5 to about 15 p.s.i.a., typically at least 3.0 p.s.i.a., and preferably greater than about 7.5 p.s.i.a.

The extruded particles useful in the invention may have any cross-sectional shape, i.e., symmetrical or asymmetrical, but most often have a symmetrical cross-sectional shape, preferably a cylindrical or polylobal shape. The cross-sectional diameter of the particles is usually about 1/40 to about 1/5 inch, preferably about 1/32 to about 1/12 inch, and most preferably about 1/24 to about 1/15 inch. Among the preferred catalyst configurations are cross-sectional shapes resembling that of a three-leaf clover, as shown, for example, in FIGS. 8 and 8A of U.S. Pat. No. 4,028,777. Preferred clover-shaped particulates are such that each "leaf" of the cross-section is defined by about a 270° arc of a circle having a diameter between about 0.02 and 0.05 inch. Other preferred particulates are those having quadralobal cross-sectional shapes, including asymmetrical shapes, and symmetrical shapes such as in FIG. 10 of U.S. Pat. No. 4,028,227. Still other particulates for the invention are available from Davison Chemical Company, a division of W. R. Grace & Company, having ring and minilith shapes, as disclosed in U.S. Pat. No. 4,510,261.

An impregnating solution containing at least one dissolved hydrogenation component precursor may be utilized to combine the catalytically active hydrogenation components with the amorphous, porous refractory support particles. If a Group VIB metal hydrogenation component is desired on the final catalyst, any of a variety of Group VIB metal compounds may be chosen for the impregnating solution, particularly those compounds soluble in aqueous media, preferably those of molybdenum or tungsten. The oxides of molybdenum (e.g. molybdenum trioxide) are preferred on the finished catalyst, and several salts containing molybdenum, particularly precursors of molybdenum trioxide, can be utilized in the impregnating solution. Also useful are salts containing both a Group VIB metal and ammonium ion, such as ammonium dimolybdate, and most preferably ammonium heptamolybdate. Preferably, the impregnating solution contains Group VI components in a total concentration between about 0.1 and about 10 weight percent and more preferably about 4.0 to about 8.0 weight percent, calculated as the trioxide. If Group VIII metals are desired on the final catalyst, the Group VIII metal compounds are preferably water-soluble, such as, a nitrate of cobalt, nickel, and iron or combinations thereof. The nitrates of cobalt and nickel are highly preferred, with nickel being most preferred. Preferably, the impregnating solution contains Group VIII components in a total concentration between about 0.01 and 5 weight percent and more preferably about 0.5 to about 3 weight percent, calculated as the monoxide. Although not usually remaining on the final catalyst composition, citric acid may often be employed in the impregnating solution in combination with the hydrogenation components, and particularly when the pH of the impregnating solution is less than 1.0.

Several methods may be employed to impregnate the catalytic support particles with an impregnating solution. One such method, commonly referred to as the spray impregnation technique, involves spraying the support with the impregnating solution. Another impregnating method, often used with relatively low concentration of hydrogenation components in the solution, is the circulation and multidip procedure wherein the support is continuously or repeatedly contacted with the impregnating solution, with or without intermittent drying. Preferred methods, however, require soaking the support in an impregnating solution or circulating the support therein, as for example, the pore volume or pore saturation technique, the continuous solution impregnation (CSI) technique and the like. The pore saturation method involves spraying or pouring onto the catalyst support a volume of impregnating solution just sufficient to fill the pores of the support but, on occasion, the volume may be up to about 10 percent excess. The concentration of hydrogenation components in the solution during impregnation by this technique may be somewhat higher than those utilized in other methods because all of the hydrogenation components in the final catalyst are contained in the minimal solution volume.

The amounts and dispersions of active hydrogenation components retained on the support particles will also depend on physical characteristics of the support particles, inter alia, surface area, pore volume, and pore size distribution. Broadly speaking, the support particles have a surface area of about 75 to about 150 m²/gram and typically above 100 m²/gram, but preferably less than about 125 m²/gram (as measured by the B.E.T. method). The total pore volume of the amorphous support, as measured by conventional mercury porosimeter methods, is usually about 0.65 to about 0.9 cc/gram, preferably about 0.70 to about 0.9 cc gram, and more preferably about 0.75 to about 0.85 cc/gram.

The support particles utilized to prepare the catalyst of the invention, as determined by conventional mercury porosimeter testing methods, typically have a narrow pore size distribution wherein at least 70, preferably at least 75, and most preferably at least 80 percent of the total pore volume is in pores of diameter from about 20 angstroms below the median pore diameter to about 20 angstroms above the median pore diameter. On a pore volume basis, the support ordinarily has at least about 0.35 cc/gram, preferably at least about 0.45 cc/gram, and most preferably at least about 0.55 cc/gram of the total pore volume in pores of diameter from about 20 angstroms below the median pore diameter to about 20 angstroms above the mode pore diameter. Also, the support usually has at least 50 percent, and preferably at least 60 percent, of the total pore volume in pores of diameter from about 10 angstroms above the median pore diameter to about 10 angstroms below the median pore diameter. On a pore volume basis, at least 0.30 cc/gram and preferably at least 0.40 cc/gram of the total pore volume is in pores of diameter from 10 angstroms above to 10 angstroms below the median pore diameter. The median pore diameter, as referred to herein, is the pore diameter represented on a pore size distribution curve of a support or catalyst at which the cumulative pore volume (cc/g.) plotted on the ordinate [vs. the pore diameter (angstroms) plotted on the abscissa] is one half. The median pore diameter of the support particles usually lies in the range from about 190 to about 240 angstroms and preferably from 200 to 220 angstroms.

An unusual feature of the pore size distribution of a preferred support is the pore volume in pores of diameter greater than about 300 angstroms. The support ordinarily has at least about 4 percent, or, in the alternative, usually at least about 0.025 cc/gram of the total pore volume in pores of diameter greater than 300 angstroms, yet does not contain more than about 10 percent of the total pore volume in pores of diameter greater than 300 angstroms. Also, the support contains less than 15 percent, preferably less than 12 percent, or, in the alternative, less than about 0.085 cc/gram and preferably less than 0.08 cc/gram, of the total pore volume in pores of diameter less than 150 angstroms. Physical characteristics of a preferred amorphous refractory oxide support, Support N, utilized in preparation of catalysts of the invention are summarized in Table I as follows:

TABLE I

| Pore Diameter Angstroms | Support | |
|---|---|---|
| | cc/gram | % PV |
| <100 | 0 | 0 |
| 100–120 | 0.01 | 1.3 |
| 120–140 | 0.01 | 1.3 |
| 140–160 | 0.01 | 1.3 |
| 160–180 | 0.03 | 4.0 |
| 180–200 | 0.22 | 29.3 |
| 200–220 | 0.37 | 49.3 |
| 220–240 | 0.02 | 2.7 |
| 240–260 | 0.01 | 1.3 |
| 260–280 | 0.01 | 1.3 |
| 280–300 | 0.01 | 1.3 |
| 300–400 | 0.02 | 2.7 |
| 400–500 | 0.01 | 1.3 |
| >500 | 0.02 | 2.7 |
| PORE VOLUME cc/gram (Merc. Poros.) | 0.75 | |
| MEDIAN PORE DIAMETER, A (Merc. Poros.) | 205 | |

TABLE I-continued

| Pore Diameter Angstroms | Support cc/gram | % PV |
|---|---|---|
| SURFACE AREA m²/gram (B.E.T. method) | 125 | |

After impregnation, the support is dried and calcined to produce a catalyst containing the hydrogenation components in desired proportions. Calcination is usually conducted at a temperature of at least 700° F., and preferably from about 750° F. to about 1,400° F., so as to convert the hydrogenation metals to their oxide forms. For example, impregnated support particles containing a significant proportion of nickel are calcined at a temperature preferably in the range from about 750° F. to about 1,000° F., and support particles containing significant amounts of cobalt are preferably calcined in the range from about 1,000° F. to about 1,400° F. Furthermore, when calcining support particles impregnated with a solution containing a Group VIII metallic nitrate, flowing air is usually passed at a sufficient rate over the support particles to remove the nitrogen oxides (NO and $NO_2$) produced by the reactions associated with the decomposition of the nitrate component.

The final composition of the catalyst of the invention comprises one or more metal hydrogenation components on the support particles. The physical characteristics of the final catalyst composition usually vary from those of the support particles by less than about 15 percent. The final composition generally contains from 0.1 to less than 12 weight percent, usually in the range from about 1 to about 10 weight percent, and preferably from about 0.5 to about 9 weight percent of the metal hydrogenation component or components, calculated as the metal trioxide. Preferred catalysts contain a Group VIB metal component, usually in the range from about 2.0 to about 10.0, preferably about 4.0 to about 8.0 weight percent, calculated as the Group VIB metal trioxide, and/or a Group VIII metal component, usually in a range from about 0.01 to about 6, preferably about 0.1 to about 4.0, and most preferably about 0.5 to about 3.0 weight percent, calculated as the Group VIII metal monoxide. The preferred Group VIB metal components are molybdenum and tungsten, with molybdenum the most highly preferred. The preferred Group VIII metal components are cobalt and nickel, with nickel the most highly preferred. Another component which may be included in the catalyst is phosphorus, usually in proportions from about 0.01 to about 5 weight percent, calculated as P.

In accordance with the invention, the catalyst is prepared so as to have a narrow pore size distribution wherein at least 70 percent, or, in the alternative, at least 0.40, and preferably greater than 0.45 cc/gram of the total pore volume is in pores of diameter from about 20 angstroms below the median pore diameter to about 20 angstroms above the median pore diameter. The median pore diameter is greater than 185 angstroms and normally above 190 angstroms usually in the range from about 190 to about 235 angstroms, and most preferably from 195 to 220 angstroms. Essentially none of the total pore volume is contained in pores of diameter less than 100 angstroms, and less than about 10 percent of the total pore volume in pores of diameter from 100 to 180 angstroms. Preferably less than about 10 percent of the total pore volume is contained in pores of diameter greater than 300 angstroms, and most preferably less than about 10 percent of the total pore volume is in pores of diameter from 220 to 300 angstroms. Preferred catalysts further have a pore size distribution wherein at least 75 percent of the total pore volume is in pores of diameter from about 20 angstroms below the median pore diameter to about 20 angstroms above the median pore diameter, less than 10 percent of the total pore volume in pores of diameter less than 180 angstroms, greater than about 4 percent to less than about 10 percent of the total pore volume is in pores of diameter greater than 300 angstroms, and at least 2.0 percent of the pore volume being in pores of diameter greater than about 500 angstroms. At least about 50 percent of the total pore volume in pores of diameter from about 10 angstroms above to about 10 angstroms below the median pore diameter. Physical characteristics of the catalyst of the invention including pore size distribution, median pore diameter (mpd), surface area and total pore volume are summarized in Table II.

TABLE II

| Physical Characteristics of Catalyst | | | |
|---|---|---|---|
| Pore Size Distribution | % of Total Pore Volume | | |
| Diameter in Angstroms | Typical | Preferred | Most Pref. |
| <100 | 0 | 0 | 0 |
| >300 | <10 | 4-10 | 5-10 |
| 160-300 | >75 | >80 | >85 |
| mpd ± 20 | >75 | >80 | >85 |
| mpd ± 10 | >50 | >55 | >60 |
| <180 | <10 | <9 | <8 |
| >240 | <10 | <9 | <8 |
| mpd | >185 | >190 <230 | >195 <220 |

The porosity characteristics for the preferred catalysts having a total pore volume greater than 0.45 cc/gm are summarized in Table IIA.

TABLE IIA

| Physical Characteristics of Catalyst | | | |
|---|---|---|---|
| Pore Size Distribution | Total Pore Volume, cc/g | | |
| Diameter in Angstroms | Typical | Preferred | Most Pref. |
| <160 | <0.05 | <0.04 | <0.035 |
| >300 | >0.08 | >0.07 | >0.06 |
| 160-300 | >0.50 | >0.55 | >0.60 |
| *mpd ± 20 | >0.40 | >0.45 | >0.50 |
| *mpd ± 10 | >0.20 | >0.25 | >0.30 |
| >180 | >0.55 | >0.60 | >0.62 |
| >220 | <0.18 | <0.15 | <0.12 |

*for median pore diameters from 190 to 220

One of the unusual features of the catalyst of the invention is the combination of the following porosity characteristics: (1) a substantial percentage of pore volume lies within both 10 and 20 angstroms from a median pore diameter in the range from greater than 180 to less than 220 angstroms, (2) a relatively small percentage of pore volume, i.e., less than 20 percent, and preferably less than 17 percent lies in pores of diameter greater than 220 angstroms, and (3) a significant percentage of pore volume lies in pores of diameter greater than 180 angstroms, i.e., at least 80 percent, preferably greater than 85 percent, and more preferably at least about 90 percent (or greater than 0.60 cc/gram). It is theorized, at least for hydrodemetallation purposes, that minimizing the number of relatively small pores of 150 angstroms diameter or less, (i.e., less than about 5 percent of the total pore volume) and maximizing the number of relatively large pores of diameter in the range from 180 to 220 angstroms up to a limit of about 80 percent of the total pore volume, maximizes the available surface area of the catalyst in pores of diameter that permit contaminant metal-containing molecules, such as asphaltenes and maltenes, to penetrate into the catalyst. The invention, however, is not limited to this or any other theory of operation.

After calcination, the final catalyst is generally activated by conventional means for its intended use in a given hydroprocess of a hydrocarbon-containing oil. The catalyst may, for example, be activated by reduction of the metal hydrogenation components to the free metal form, employed in the calcined oxide form, or converted from the oxide form to the sulfide form. When employed with active components in the sulfide form, the catalyst may be presulfided so as to convert the active metal components to the corresponding sulfides. Usually the catalyst is presulfided prior to use by contact with a stream of sulfiding gas, such as hydrogen sulfide-hydrogen mixtures containing about 1 to 10 volume percent of hydrogen sulfide, at temperatures between about 200° F. and 1,200° F. Although presulfiding the catalyst is preferred, it is not essential, as the catalyst may be sulfided "in situ" in a short time by contact with an organosulfur-containing feedstock processed under hydroprocessing conditions.

The catalyst of the invention may be employed in any of several processes for hydroprocessing hydrocarbon-containing oils wherein catalytic composites containing Group VIB and/or Group VIII metals are known to be catalytically effective, such as hydrogenation, dehydrogenation, hydrodesulfurization, oxidation, hydrodenitrogenation, hydrodemetallation, hydroisomerization, hydrocracking, mild hydrocracking, hydroreforming, and the like. Contemplated for treatment by the process of the invention are relatively high boiling hydrocarbon-containing oils including crude petroleum oils and synthetic crudes. Among the typical oils contemplated are crudes, vacuum and atmospheric residual fractions, light and heavy atmospheric and vacuum distillate oils, deasphalted oils, shale oils, and oils from bituminous sands, coal compositions and the like. Typical hydrocarbon-containing residuum oils for use herein contain at least about 10 volume percent of components normally boiling above about 1,050° F. Other hydrocarbon-containing oils include lubricating oils, waxes, kerosene, solvent naphthas, fuel oils, diesel fuels, jet fuels, heavy hapthas, light naphthas, cycle oils from cracking operations, coker distillates, cracked gasoline, decant oils and the like.

Although virtually any high boiling hydrocarbon-containing feedstock may be treated by hydroprocessing with the catalyst of the invention, the catalyst is particularly suited to treating residuum oils, i.e., heavy residual fractions, especially the atmospheric and vacuum residuum oils containing at least about 2 ppmw of contaminant metals (vanadium, nickel, and the like). Sulfur is usually present in such oils in a proportion exceeding 0.1 weight percent, with a typical feedstock containing about 1 to about 8.0 weight percent. The feedstock contains undesirable proportions of nitrogen, usually in a concentration greater than about 2 PPmw and often between about 2 ppmw and 5000 ppmw. ordinarily, the feedstock contains less than 200 ppmw of nickel and vanadium contaminant metals, calculated as Ni plus V, with preferred feedstocks containing less than 100 ppmw and most preferably less than 50 ppmw of said materials. The feedstock can contain waxy components, e.g., n-paraffins and slightly-branched paraffins, and thus have a high pour point, e.g., at least about 30° F. high pour point.

The catalyst is employed as either fixed, ebullating, slurried or fluidized bed (but most usually a fixed bed) of particulates in a suitable reactor vessel wherein the hydrocarbon oil to be treated is introduced and subjected to hydroprocessing conditions comprising an elevated total pressure, temperature, and hydrogen partial pressure. The hydrocarbon oil and catalyst are subjected to a hydrogen partial pressure usually in the range from about 100 to about 4,000 p.s.i.g. at a liquid hourly space velocity (LHSV) usually in the range from about 0.05 to about 10 $h^{-1}$ so as to effect the desired hydroprocessing reactions, for example, demetallation, desulfurization and/or denitrogenation, i.e., so as to effect the desired degree of conversion of, for example, sulfur, nitrogen and metal-containing compounds to hydrogen sulfide, ammonia, and metal forms capable of being deposited in the catalyst, respectively. The catalyst of the invention is particularly effective for desulfurization, denitrogenation and demetallation reactions, especially when utilized to process hydrocarbon oils such as residuum fractions. In the hydroprocessing of a hydrocarbon oil, the catalyst is usually maintained in a hydroprocessing reactor as a fixed bed with the feedstock passing downwardly once therethrough. In some instances, one or more additional reactors may be added to the single reactor, either in series or parallel. If the feedstock is usually high in organometallic compounds, it may be pretreated, integrally or separately, using a conventional hydrodemetallation catalyst, a hydrodemetallation catalyst of the invention, or mixtures thereof.

Typical hydroprocessing conditions suitable for hydrodemetallation, hydrodenitrogenation, hydrodesulfurization, or for yielding less than about 10 volume percent conversion of the oil fraction boiling above 1,050° F. to liquid products boiling at or below 1,050° F., are shown in the following Table III:

TABLE III

| Operating Conditions | Suitable Range | Preferred Range |
| --- | --- | --- |
| Temperature, °F. | 500–900 | 600–850 |
| Hydrogen Pressure, p.s.i.g. | 200–4,000 | 500–2,500 |
| Space Velocity, LHSV | 0.05–5.0 | 01.–3.0 |
| Hydrogen Recycle Range, scf/bbl | 500–15,000 | 1,000–10,000 |

Generally, the hydrogen partial pressure maintained during hydroprocessing is more than 50 percent of the total pressure. Usually, for once-through operation, the hydrogen partial pressure is between about 85 and 95 percent of the total pressure while, for recycle operation, the hydrogen partial pressure is somewhat lower, i.e., between 80 and 85 percent of the total pressure.

Hydroprocessing, in accordance with the invention, may include either serial or simultaneous demetallation, desulfurization and denitrogenation of a feedstock. Simultaneous demetallation, desulfurization, denitrogenation and heavy component (1,050° F. plus components) conversion involves contacting a hydrocarbon-containing feedstock with the catalyst of the invention under conditions effecting (1) a lower contaminant metals, sulfur and/or nitrogen content in the effluent and (2) a higher percentage of liquid products boiling at or below 1,050° F. in the effluent as compared to the feedstock. Serial demetallation, desulfurization and denitrogenation of a feedstock by contact with the catalyst of the invention involves removing sulfur and nitrogen from the feedstock either concurrently, or after removal of contaminant metals.

A preferred embodiment of the invention comprises a combined hydrodemetallation, hydrodesulfurization and hydrodenitrogenation reaction zone wherein the catalyst is located in an upstream portion of a fixed bed relative to a downstream catalyst bed portion containing a desulfurization and/or denitrogenation catalyst having a median pore diameter at least 30 (and preferably at least 100) angstroms smaller than that of the catalyst of the invention.

The catalyst of the invention exhibits improved activity and stability for the removal of contaminant metals during the course of the hydroprocess, and particularly over the second half of a hydroprocess run length when the metals deposition capacity of the catalyst is greater than 40 percent. During such a hydroprocess, as shown hereinafter in the example, the catalyst of the invention provides surprisingly improved catalyst stability for simultaneous hydroconversion of organosulfur, organonitrogen and organometallic compounds compared to two reference catalysts.

The invention is further illustrated by the following examples which are illustrative of specific modes of practicing the invention and are not intended as limiting the scope of the invention as defined in the appended claims.

EXAMPLE

Catalyst A prepared in accordance with the invention, is tested under typical hydrodesulfurization and hydrodemetallation conditions against reference hydrodesulfurization/hydrodemetallation catalysts, Catalysts X, Y and Z. Catalysts A, X, Y and Z have 1/20-inch asymmetrical quadralobal cross-sectional shapes. Catalysts X and Y have nominal compositions of 12.0 weight percent of molybdenum components, calculated as $MoO_3$, 4.0 weight percent of cobalt components, calculated as $CoO$, and the balance of a composite support containing approximately 75 parts of gamma and 25 parts of delta alumina, calculated as $Al_2O_3$, as detected by X-Ray Diffraction (XRD) analysis. Catalysts Z and A have nominal compositions of 6.0 weight percent of molybdenum components, calculated as $MoO_3$, 1.0 weight percent of nickel components, calculated as $NiO$, and the balance of a composite support containing approximately 75 parts of gamma alumina and 25 parts of delta alumina, calculated as $Al_2O_3$, as detected by XRD analysis.

Cobalt-containing Catalysts X and Y are prepared with an impregnating solution prepared by placing 21.8 grams of ammonium heptamolybdate (AHM) in a beaker containing 45 ml of water. Cobalt nitrate [$CO(NO_3)_2 \cdot 6H_2O$] in the amount of 22.9 grams is then dissolved in the resulting solution. After dissolution of the cobalt nitrate, an impregnating solution having a volume of 100 ml is prepared. The procedure is repeated in the preparation of nickel-containing Catalysts Z and A to produce two impregnating solutions having the same final volume, except 9.8 grams of ammonium heptamolybdate and 5.2 grams of nickel nitrate [$NI(NO_3)_2 \cdot 6H_2O$] are utilized during preparation of the impregnating solutions.

Two different portions of amorphous support particles, designated as supports M and N and each containing gamma and delta alumina, are prepared by first slowly adding a diluted sulfuric acid solution to an aqueous solution of sodium aluminate. The resulting aluminate solution has a pH in the range from about 5 to about 6. An aqueous ammonium hydroxide solution is mixed with the resulting aluminate solution to raise the pH sufficiently (i.e. in the range from about 8-10) to completely precipitate an alumina gel. Excess water is drained and then the alumina gel is washed and spray-dried to obtain a powder. The powder is mulled with acidified water and extruded through a die. The extrudate is then dried, broken up, and calcined at 1,900° F. for two hours, with support N being calcined in the presence of water vapor at one atmosphere. The vapor pressure in the calciner is approximately 15 p.s.i.a. The two portions of the calcined support particles each contain about 25.0 weight percent of delta alumina and about 75.0 weight percent of gamma alumina, calculated as $Al_2O_3$, respectively.

Four 125 grams portions of the gamma/delta alumina support particles, two of support M and two of support N, are then contacted with the impregnating solutions as follows: Catalysts X (cobalt) and Z (nickel) with support M, and Catalysts Y (cobalt) and A (nickel) with support N. Substantially all 100 ml of each impregnating solution is taken up by each of the supports.

The impregnated cobalt-containing compositions, Catalysts X and Z, are allowed to stand (age) for two hours following which they are oven dried at 110° C. and then calcined at 1,022° F. for one-half hour in flowing air. The impregnated nickel-containing compositions, Catalysts Y and A, are treated with the same procedure as the cobalt-containing compositions, except they are calcined at 900° F. The final catalyst of the invention, Catalyst A, and reference Catalysts X, Y, and Z have pore size distributions as shown in Table IV.

TABLE IV

| Pore Dia. (Å) | Pore Volume and % of Total Pore Volume in Indicated Interval | | | | | | | |
|---|---|---|---|---|---|---|---|---|
| | Cat. X | | Cat. Y | | Cat. Z | | Cat. A | |
| | (cc/g) | %, PV | (cc/g) | %, PV | (cc/g) | %, PV | (cc/g) | %, PV |
| <40 | 0 | 0 | 0 | 0 | 0 | 0 | 0 | 0 |
| 40–60 | 0 | 0 | 0 | 0 | 0 | 0 | 0 | 0 |
| 60–80 | 0 | 0 | 0 | 0 | 0.005 | 0.5 | 0 | 0 |
| 80–100 | 0 | 0 | 0.005 | 1 | 0.005 | 0.5 | 0 | 0 |
| 100–120 | 0 | 0 | 0.005 | 1 | 0.01 | 1.5 | 0.01 | 1.5 |
| 120–140 | 0.02 | 3 | 0.01 | 1.5 | 0.03 | 4 | 0.01 | 1.5 |
| 140–160 | 0.02 | 3 | 0.02 | 3 | 0.09 | 13 | 0.01 | 1.5 |
| 160–180 | 0.12 | 18 | 0.03 | 5 | 0.14 | 20 | 0.03 | 4 |
| 180–200 | 0.15 | 22 | 0.09 | 14.5 | 0.15 | 21.5 | 0.20 | 28.5 |
| 200–220 | 0.16 | 24 | 0.30 | 48.5 | 0.10 | 14 | 0.34 | 48.5 |
| 220–240 | 0.09 | 13 | 0.095 | 15 | 0.06 | 8.5 | 0.02 | 3 |
| 240–260 | 0.03 | 4 | 0.015 | 2.5 | 0.03 | 4 | 0.01 | 1.5 |
| 260–280 | 0.01 | 1.5 | 0.005 | 1 | 0.02 | 3 | 0.01 | 1.5 |

TABLE IV-continued

| Pore Dia. (Å) | Pore Volume and % of Total Pore Volume in Indicated Interval | | | | | | | |
|---|---|---|---|---|---|---|---|---|
| | Cat. X | | Cat. Y | | Cat. Z | | Cat. A | |
| | (cc/g) | %, PV | (cc/g) | %, PV | (cc/g) | %, PV | (cc/g) | %, PV |
| 280–300 | 0.01 | 1.5 | 0.005 | 1 | 0.01 | 1.5 | 0.01 | 1.5 |
| 300–400 | 0.02 | 3 | 0.015 | 2.5 | 0.02 | 3 | 0.02 | 3 |
| 400–500 | 0.01 | 1.5 | 0.005 | 1 | 0.01 | 1.5 | 0.01 | 1.5 |
| >500 | 0.03 | 4.5 | 0.02 | 3 | 0.02 | 3 | 0.02 | 3 |
| TOTAL PV (Merc. Poros.) | 0.67 | | 0.62 | | 0.70 | | 0.70 | |
| Median Pore Diameter Å (Merc. Poros.) | 200 | | 210 | | 188 | | 204 | |
| Surface Area m²/gram | 135 | | 125 | | 149 | | 114 | |

The test is conducted by contacting the catalysts in separate runs with the feedstock identified in Table V under hydroprocessing conditions. However, at the outset of each run, the respective catalysts are presulfided by contact for about 16 to 20 hours will a gas consisting of 90 volume percent $H_2$ and 10 volume percent $H_2S$ flowing at 4.4 SCFM (one atmosphere pressure). The temperature during the presulfiding is initially at room temperature, is increased gradually until 700° F. is reached, and then lowered to 450° F., at which time the catalyst is contacted with the feedstock.

TABLE V

| Feedstock Properties | |
|---|---|
| Feed Description | Hondo/Santa Maria Blend Atmospheric Resid |
| Gravity, °API | 14.3 |
| Sulfur, wt. % | 4.30 |
| Total Nitrogen, wt. % | 0.38 |
| Asphaltenes (C5), wt. % | 13.7 |
| Nickel, ppmw | 91 |
| Vanadium, ppmw | 216 |
| ASTM D-1160, Vol % | Distillation, °F. |
| IBP | 475 |
| 10 | 540 |
| 30 | 716 |
| 50 | 928 |
| 60 | 1,017 |
| EP | 1,035 |
| rec. | 65 |

A portion of the feedstock of Table V is passed downwardly through a reactor vessel and contacted in separate runs for forty (40) days with Catalysts A, X, Y and Z, respectively, in a single-stage, single-pass with once-through hydrogen. The operating conditions during each run are summarized as follows: 2,000 p.s.i.g. total pressure, 1.75 LHSV, a hydrogen rate of 5,000 SCF/bbl, and a temperature sufficient to maintain 70 percent demetallation of the feedstock.

The hydroprocess run is continued in this manner for 40 days, at which time about 56 weight percent of contaminant metals (Ni+V) have been deposited on the catalysts (fresh catalyst basis). The feed is replaced with heavy Arabian atmospheric resid having properties described in Table VI and the run is continued for 16 more days. After a total of 56 days the level of contaminant metals on the catalysts is about 65 weight percent—a level that is often needed commercially to satisfy end-of-run requirements.

TABLE VI

| Feedstock Properties | |
|---|---|
| Feed Description | Heavy Arabian Atmospheric Resid |
| Gravity, °API | 11.8 |
| Sulfur, wt. % | 3.89 |
| Total Nitrogen, wt. % | 0.32 |
| Asphaltenes (C5), wt. % | 12.6 |
| Nickel, ppmw | 31 |
| Vanadium, ppmw | 102 |
| ASTM D-1160, Vol. % | Distillation, °F. |
| IBP | 550 |
| 10 | 792 |
| 30 | 912 |
| 50 | 1,059 |
| EP | 1,092 |
| rec | 56 |

Giving Catalyst X an arbitrary activity of 100 in the reference hydroprocess, the relative volume activity (RVA) of Catalyst A of the invention and Catalysts Y and Z for demetallation and desulfurization are determined by calculation and tabulated in comparison to Catalyst S in Table VII. These demetallation and desulfurization activity determinations are based on a comparison of the reaction rates for demetallation and desulfurization, respectively obtained from the data of the experiment according to the following standard equation which assumes second order kinetics for both processes:

$$\text{Relative Desulfurization Activity } \frac{(1/S_p) - (1/S_f)}{(1/S_{pr}) - (1/S_{fr})} \times 100$$

where $S_{fr}$ and $S_{pr}$ are the respective concentrations of sulfur in the feed and product obtained with the reference catalyst and $S_f$ and $S_p$ are the respective concentrations of sulfur in the feed and product obtained with a catalyst being compared to the reference.

$$\text{Relative Demetallation Activity } \frac{(1/M_p) - (1/M_f)}{(1/M_{pr}) - (1/M_{fr})} \times 100$$

where $M_{fr}$ and $M_{pr}$ are the respective concentrations of sulfur in the feed and product obtained with the reference catalyst and $M_f$ and $M_p$ are the respective concentrations of metals in the feed and product obtained with a catalyst being compared to the reference.

The RVA for metals and sulfur conversion after 10 days of each run and after 56 days of each run is obtained for each catalyst and set forth in Table VII. The data in Table VII indicate that Catalyst A containing less than 10 weight percent of nickel and molybdenum hydrogenation metals and having porosity characteristics including a median pore diameter (mpd) in the range from 195-215 and at least 70% of its total pore volume within 10 above and below the mpd, is more active for demetallation than the reference catalysts after 56 days.

TABLE VII

| Cat- | RVA for sulfur removal, S | | RVA for metals removal, Ni + V | |
|---|---|---|---|---|
| alyst | day | | | |
| | 10, | 56 | 10, | 56 |
| X | 100 | 100 | 100 | 100 |
| Y | 106 | 99 | 100 | 96 |
| Z | 95 | 87 | 96 | 90 |
| A | 76 | 86 | 93 | 115 |

It is surprising that Catalyst A of the invention is more active for demetallation, after 56 days, than Catalyst Y which has larger pores, i.e., a median pore diameter of 210 for Catalyst Y vs. 204 for Catalyst A. Also, during the course of the run, Catalyst A exhibits relative improvement for desulfurization.

While particular embodiments of the invention have been described, it will be understood, of course, that the invention is not limited thereto since many obvious modifications can be made, and it is intended to include within this invention any such modifications as will fall within the scope of the invention as defined by the appended claims.

We claim:

1. A hydroprocess of a hydrocarbon-containing feedstock catalyzed under conditions including a hydrogen partial pressure from about 100 to about 4,000 p.s.i.g., an elevated temperature, and a LHSV from about 0.05 to 10, by the catalyst composition comprising nickel and molybdenum hydrogenation metal components on a porous, amorphous refractory oxide support containing delta alumina, said composition further comprising a median pore diameter in the range of about 185 to about 230 angstroms.

2. The process defined in claim 1 wherein said catalyst composition comprises about 0.1 to about 3 weight percent of said nickel components, calculated as NiO, and about 2.0 to about 10.0 weight percent of said molybdenum components, calculated as MoO$_3$.

3. The process defined in claim 1 wherein said catalyst composition further comprises a pore size distribution wherein at least 85 percent of the total pore volume is in pores of diameter greater than about 180 angstroms and less than 10 percent of the total pore volume is in pores of diameter greater than 300 angstroms.

4. The process defined in claim 1 wherein said delta alumina comprises between about 10 and about 50 weight percent.

5. The process defined in claim 1 wherein said support further comprises gamma alumina and said median pore diameter is between 190 and 230 angstroms.

6. The process defined in claim 1 wherein said median pore diameter is between 195 and 220 angstroms and less than about 5 percent of the total pore volume in pores of diameter less than about 150 angstroms.

7. A process for upgrading a hydrocarbon residuum-containing feedstock containing contaminant metals, said process comprising contacting a catalyst composition consisting essentially of about 0.1 to about 3 weight percent of nickel components, calculated as NiO, and about 2.0 to about 10.0 weight percent of molybdenum components, calculated as MoO$_3$, at least one porous, amorphous refractory oxide support containing gamma alumina and between 1 and 50 weight percent of delta alumina, calculated as Al$_2$O$_3$, said composition having a median pore diameter between about 190 about 220 angstroms and more than about 85 percent of the total pore volume in pores of diameter greater than 180 angstroms with said feedstock under hydroprocessing conditions including a hydrogen pressure from 200 to 4,000 p.s.i.g., a temperature from 500° to 900° F., and a LHSV from 0.05 to 5.0, to produce a product containing less contaminant metals than contained in said feedstock.

8. The process defined in claim 7 wherein said catalyst composition has a narrow pore size distribution wherein at least 60 percent of the pore volume is in pores of diameter within about 20 angstroms above or 20 angstroms below said median pore diameter.

9. The process defined in claim 8 wherein less than 10 percent of the total pore volume is in pores of diameter from about 100 to about 180 angstroms and less than 10 percent of the total pore volume is in pores of diameter greater than 300 angstroms.

10. The process defined in claim 9 wherein less than 10 percent of the total pore volume of said catalyst composition is in pores of diameter from about 220 to about 300 angstroms.

11. A hydrodesulfurization process comprising contacting a hydrocarbon-containing feedstock containing sulfur, nitrogen and metal contaminants with a catalyst composition comprising nickel and molybdenum hydrogenation metal components and alumina, said catalyst composition further comprising between 1 and 50 weight percent of delta alumina, calculated as Al$_2$O$_3$, and having a median pore diameter greater than 185 angstroms.

12. The process defined in claim 11 wherein said catalyst composition further comprises at least 85 percent of the total pore volume in pores of diameter greater than 180 angstroms.

13. The process defined in claim 11 wherein said median pore diameter is between 190 and 230 angstroms.

14. The process defined in claim 11 wherein said alumina comprises gamma alumina and said median pore diameter is between 195 and 220 angstroms.

15. The process defined in claim 11 wherein said catalyst composition further comprises a narrow pore size distribution wherein at least 60 percent of the pore volume is in pores of diameter within about 20 angstroms above or 20 angstroms below said median pore diameter.

16. A hydrodemetallation process comprising contacting a hydrocarbon-containing feedstock containing metal contaminants with a catalyst composition comprising nickel and molybdenum hydrogenation metal components on a porous, amorphous refractory oxide support containing delta alumina, said composition further comprising a median pore diameter greater than about 185 angstroms and less than about 15 percent of the total pore volume in pores of diameter less than 180 angstroms.

17. The process defined in claim 16 wherein said catalyst composition comprises about 0.1 to about 3 weight percent of said nickel components, calculated as NiO, and about 2.0 to about 10.0 weight percent of said molybdenum components, calculated as MoO$_3$, and wherein said median pore diameter is greater than 190 angstroms.

18. The process defined in claim 16 wherein said catalyst composition further comprises a pore size distribution wherein at least 90 percent of the total pore volume is in pores of diameter greater than about 180 angstroms and less than 10 percent of the total pore volume is in pores of diameter greater than 300 angstroms.

19. The process defined in claim 16 wherein said catalyst composition comprises between 15 and 45 weight percent of said delta alumina and the balance of said support consists essentially of gamma alumina.

20. The process defined in claim 16 wherein said support is prepared by a method comprises a step wherein a material containing aluminum is calcined at a temperature at least 1,800° F. for at least one half hour in an atmosphere containing elemental diatomic oxygen gas and water vapor.

21. The process in claim 20 wherein said temperature is at least about 1,850° F. and a partial pressure of said water vapor in the calcination atmosphere is at least 3.0 p.s.i.a.

* * * * *

UNITED STATES PATENT AND TRADEMARK OFFICE
CERTIFICATE OF CORRECTION

PATENT NO. : 5,300,217
DATED : April 5, 1994
INVENTOR(S) : Howard D. Simpson and Milan Skripek It is certified that error appears in the above-identified patent and that said Letters Patent is hereby corrected as shown below:

Claim 20, column 18, line 2, replace "comprises" with
-- comprising --.

Signed and Sealed this

Ninth Day of August, 1994

Attest:

BRUCE LEHMAN

*Attesting Officer*     Commissioner of Patents and Trademarks